(12) United States Patent
Jonsson et al.

(10) Patent No.: US 9,234,522 B2
(45) Date of Patent: Jan. 12, 2016

(54) HYBRID BEARING TURBOMACHINE

(75) Inventors: Ulf J. Jonsson, South Windsor, CT (US); Bruce P. Biederman, Old Greenwich, CT (US); Frederick J. Cogswell, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1024 days.

(21) Appl. No.: 13/342,500

(22) Filed: Jan. 3, 2012

(65) Prior Publication Data

US 2013/0170943 A1 Jul. 4, 2013

(51) Int. Cl.
*F04D 29/051* (2006.01)
*F04D 29/058* (2006.01)
*F04D 29/059* (2006.01)

(52) U.S. Cl.
CPC ............ *F04D 29/051* (2013.01); *F04D 29/058* (2013.01); *F04D 29/059* (2013.01)

(58) Field of Classification Search
CPC .............................. F01D 25/162; F01D 25/164
See application file for complete search history.

(56) References Cited

U.S. PATENT DOCUMENTS

| | | | | |
|---|---|---|---|---|
| 2,757,988 A | * | 8/1956 | Lecourbe | ....................... 384/481 |
| 4,430,011 A | | 2/1984 | Kun | |
| 5,628,191 A | * | 5/1997 | Kueck et al. | ..................... 60/655 |
| 5,803,612 A | | 9/1998 | Battig | ............................. 384/99 |
| 5,857,348 A | * | 1/1999 | Conry | .............................. 62/209 |
| 5,977,677 A | | 11/1999 | Henry et al. | |
| 6,881,027 B2 | | 4/2005 | Klaass et al. | |
| 6,965,181 B1 | | 11/2005 | Heshmat et al. | |
| 7,223,020 B2 | * | 5/2007 | Bauer et al. | ................... 384/535 |
| 7,723,883 B2 | | 5/2010 | Ozaki et al. | |
| 2003/0201683 A1 | * | 10/2003 | Chen et al. | ....................... 310/90 |
| 2004/0109760 A1 | | 6/2004 | Jones | |
| 2008/0245082 A1 | | 10/2008 | Sishtla | |
| 2010/0247010 A1 | | 9/2010 | Lee et al. | |
| 2011/0156394 A1 | | 6/2011 | Klusman | |

FOREIGN PATENT DOCUMENTS

| | | |
|---|---|---|
| EP | 0867628 | 9/1998 |
| EP | 1840393 | 10/2007 |
| GB | 1331166 | 9/1973 |
| GB | 2298901 | 9/1996 |

(Continued)

OTHER PUBLICATIONS

International Search Report and Written Opinion for PCT Application No. PCT/US2012/071968 mailed Mar. 8, 2013.

(Continued)

*Primary Examiner* — Edward Look
*Assistant Examiner* — Christopher J Hargitt
(74) *Attorney, Agent, or Firm* — Carlson, Gaskey & Olds, P.C.

(57) ABSTRACT

A turbomachine includes a housing and a rotatable shaft, where at least a portion of the rotatable shaft is located in the housing. The turbomachine also includes a magnetic thrust bearing that axially positions the rotatable shaft and a radial bearing that centers the rotatable shaft. The turbomachine includes a flexure including a first portion secured to the housing and a second portion axially moveable relative to the first portion. The second portion of the flexure is connected to the radial bearing, and the second portion moves axially to eliminate thrust loads on the radial bearing and allow the magnetic thrust bearing to carry axial loads.

21 Claims, 3 Drawing Sheets

(56) References Cited

FOREIGN PATENT DOCUMENTS

| | | |
|---|---|---|
| JP | 7-91760 | 4/1995 |
| JP | 8-261237 | 10/1996 |
| JP | 2623202 | 6/1997 |
| JP | 2008082426 | 4/2008 |
| JP | 2008190376 | 8/2008 |

OTHER PUBLICATIONS

International Preliminary Report on Patentability for International Application No. PCT/US2012/071968 mailed on Jul. 17, 2014.
European Search Report for EP Application No. 12864647.8 dated Sep. 14, 2015.

* cited by examiner

HYBRID BEARING TURBOMACHINE

BACKGROUND OF THE INVENTION

High speed turbomachines can employ various types of bearings. For example, rolling element bearings, magnetic bearings, foil bearings or fluid film bearings can be employed.

Oil free turbomachines provide many benefits. For one, there are more effective heat transfer surfaces and no issues with oil stability or contamination. Oil free turbomachines have employed magnetic bearings, hydrostatic bearings, or foil bearings. Turbomachines have also been developed using refrigerant lubricated roller bearings and hydrostatic bearings.

Disadvantages of current turbomachines are the expense and complexity of the magnetic bearing, as well as scaling problems with foil bearings that makes large machines unfeasable. Additionally, the power consumption of hydrostatic bearings can be high, and when operated under high loads, the reliability of ball bearings can decrease.

SUMMARY OF THE INVENTION

A turbomachine includes a housing and a rotatable shaft, where at least a portion of the rotatable shaft is located in the housing. The turbomachine also includes a magnetic thrust bearing that axially positions the rotatable shaft and a radial bearing that centers the rotatable shaft. The turbomachine includes a flexure including a first portion secured to the housing and a second portion axially moveable relative to the first portion. The second portion of the flexure is connected to the radial bearing, and the second portion moves axially to eliminate thrust loads on the radial bearing and allow the magnetic thrust bearing to carry axial loads.

Another turbomachine includes a housing and a rotatable shaft. At least a portion of the rotatable shaft is located in the housing, and the rotatable shaft is substantially vertical when the turbomachine is in use. The turbomachine includes a magnetic thrust bearing that axially positions the rotatable shaft and a radial bearing that centers the rotatable shaft. The turbomachine is employed in a system that employs a working fluid, and the working fluid lubricates the radial bearing. The turbomachine includes a flexure including a first portion secured to the housing and a second portion axially moveable relative to the first portion. The second portion of the flexure is connected to the radial bearing, and the second portion moves axially to reduce thrust loads on the radial bearing and allow the magnetic thrust bearing to carry axial loads.

A method of reducing thrust loads on a radial bearing of a turbomachine includes the steps of rotating a shaft located in a housing of the turbomachine and axially positioning the shaft with a magnetic thrust bearing. The method further includes the steps of securing a first portion of a flexure to the housing and axially moving a second portion of the flexure relative to the first portion of the flexure to axially translate the radial bearing to eliminate axial loads on the radial bearing and allow by the magnetic thrust bearing to carry axial loads.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
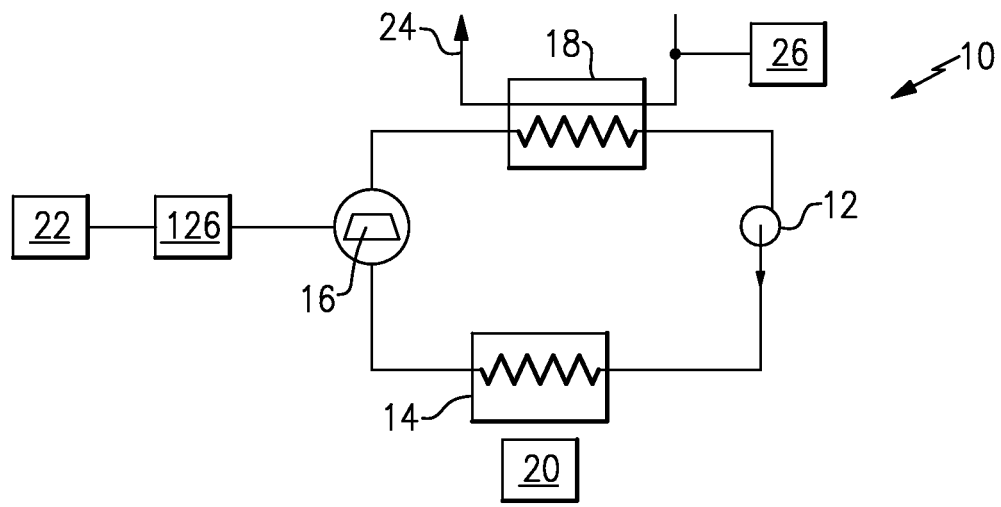
FIG. 1 schematically illustrates an organic rankine cycle.

FIG. 1 illustrates an example organic rankine cycle 10 that converts heat into work. The organic rankine cycle 10 includes a pump 12, an evaporator 14, a turbine 16, and a condenser 18. An organic fluid circulates through the closed circuit system. The fluid flows as a liquid through the pump 12 and is pumped from a low pressure to a high pressure. The high pressure liquid then flows through the evaporator 14, where the fluid is heated and boiled at a constant pressure by an external heat source 20, and the fluid becomes a vapor. The vapor flows through the turbine 16 and is expanded, generating power. The shaft power generated by the turbine 16 is fed to a generator 126, which converts the shaft power to electrical power which is provided to an electric power grid 22 or load. The temperature and the pressure of the vapor decreases. The vapor then enters the condenser 18, where the fluid rejects heat to a cooling medium 24, heating the cooling medium 24. A pump or fan 26 moves the fluid medium 24 through the condenser 18. The fluid is condensed to become a saturated liquid. The liquid then flows through the pump 12, completing the cycle.

Figure 2:
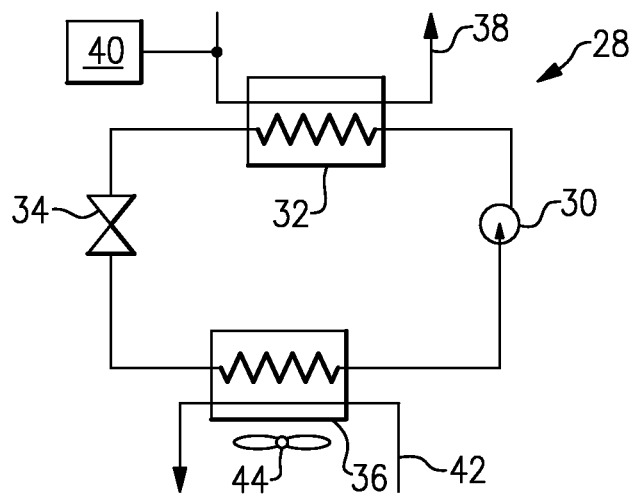
FIG. 2 schematically illustrates a refrigeration system.

FIG. 2 illustrates an example vapor compression system 28 that includes a compressor 30, a condenser 32, an expansion device 34, and an evaporator 36. Refrigerant circulates through the closed circuit system. The refrigerant exits the compressor 30 at a high pressure and a high enthalpy. The refrigerant then flows through the condenser 32 at a high pressure. A fluid medium 38, such as water or air, flows through the condenser 32 and accepts heat from the refrigerant flowing through the condenser 32. The refrigerant exits the condenser 32 at a low enthalpy and a high pressure. A water pump or fan 40 moves the fluid medium 38 through the condenser 36. The refrigerant then passes through the expansion device 34, which regulates the flow of the refrigerant. The refrigerant then flows through the evaporator 36 and exits at a high enthalpy and a low pressure. In the evaporator 36, the refrigerant accepts heat from a fluid medium 42, heating the refrigerant. In one example, the fluid medium 42 is air, and a fan 44 blows the fluid medium 42 through the evaporator 36. The refrigerant then reenters the compressor 30, completing the cycle.

Figure 3:
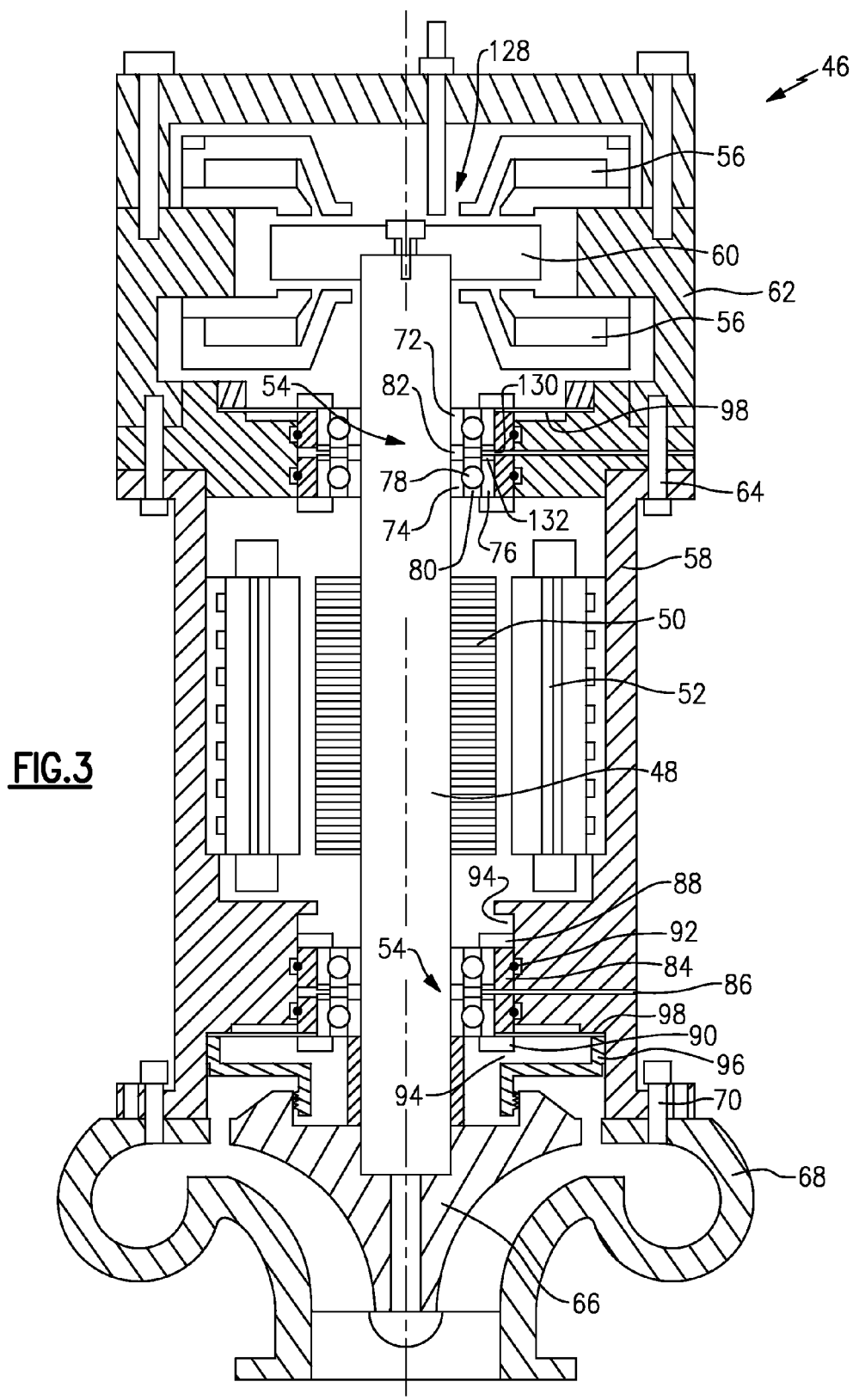
FIG. 3 schematically illustrates a cross-sectional view of a turbomachine.

FIG. 3 schematically illustrates a cross-sectional view of a turbomachine 46. The above-described turbine 16 and compressor 30 are both turbomachines 46. The turbomachine 46 can also be a gas expander or a steam turbine. The below-mentioned and described components of the turbomachine 46 are circumferential in shape.

The turbomachine 46 includes a rotatable shaft 48, a rotor 50, a stator 52, and two sets of radial bearings 54 housed in a main housing 58. Each set of radial bearings 54 can be mounted in bearing units. The stator 52 is fixed inside the main housing 58, and the rotor 50 is fixed to and rotates with the rotatable shaft 48. The sets of radial bearings 54 allow for smooth rotation of the rotor 50 and are lubricated with a liquid working fluid of the turbomachine 46. In one example, the working fluid is refrigerant.

If the turbomachine 46 is a compressor 30, rotation of the rotatable shaft 48 compresses the refrigerant to a high pressure. If the turbomachine 46 is a turbine 16, rotation of the rotatable shaft 48 expands the vapor, providing power.

A magnetic thrust bearing 128 includes a magnetic thrust bearing housing 62 contains a rotating thrust disc 60 located between magnetic actuators 56. The rotating thrust disc 60 is attached to an end of the rotatable shaft 48 and is located between the magnetic actuators 56. The magnetic thrust bearings 128 manage axial, or thrust, loads. The magnetic thrust bearing 128 locates the rotatable shaft 48 axially by providing forces countering the force from an impeller 66 and gravity, as well as other forces. The main housing 58 and magnetic thrust bearing housing 62 are attached with a fastener 64. Magnetic thrust bearings 128 are less complicated than radial bearings 54, and their load capacity is better than other types of oil free bearings.

An impeller 66 is attached to an opposing end of the rotatable shaft 48 and is located in an impeller housing 68. The main housing 58 and the impeller housing 68 are attached with a fastener 70.

Each set of radial bearings 54 includes two ball bearings 72. Each ball bearing 72 includes a circular inner race 74, a circular outer race 76, and a plurality of balls 78 encased in a cage 80 located between the circular inner race 74 and the circular outer race 76. Each ball bearing 72 is in contact with the rotatable shaft 48. In one example, the plurality of balls 78 are ceramic.

A spacer 82 that contacts the rotatable shaft 48 is located between the circular inner races 74 of the two ball bearings 72 of each set of radial bearings 54, and a spacer 130 is located between the circular outer races 76 of the two ball bearings 72. The spacer 130 includes a passage 132 that allows the working fluid to flow to the ball bearings 72. A bearing housing 84 including a portion of a working fluid passage 86 is located radially outwardly from each set of ball bearings 72. The working fluid passage 86 allows the working fluid to flow to cool and lubricate the ball bearings 72.

A first travel stop 88 is located on one side of the bearing housing 84, and a second travel stop 90 is located on an opposing side of the bearing housing 84. The travel stops 88 and 90 limit the axial translation/travel of the ball bearings 72, and a gap 94 is defined axially outwardly from the travel stops 88 and 90. The main housing 58 is located radially outwardly from the bearing housing 84 and also defines a portion of the working fluid passage 86 that provides the working fluid to the radial bearings 54. A seal 92, for example an O-ring, provides a seal between the bearing housing 84 and the main housing 58 to prevent leakage of the working fluid that flows through the working fluid passage 86 between the main housing 58 and the bearing housing 84.

Figure 4:
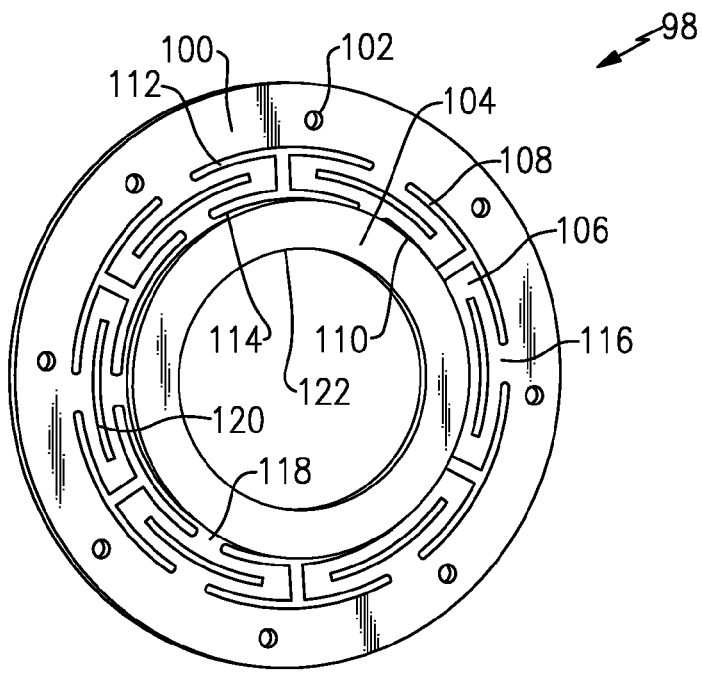
FIG. 4 schematically illustrates a flexure of the turbomachine in an initial position.
Figure 5:
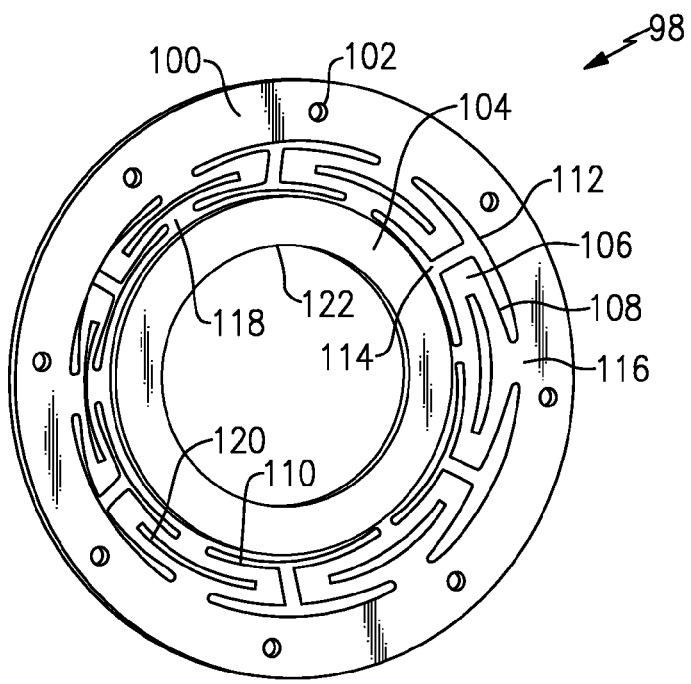
FIG. 5 schematically illustrates the flexure of the turbomachine in an extended position.

FIGS. 4 and 5 illustrate a flexure 98 of the turbomachine 46. FIG. 4 shows the flexure 98 when flat in an initial position, and FIG. 5 shows the flexure 98 in an extended position when extended to eliminate or reduce thrust loads from the radial bearings 54 that are caused by the translation of the rotatable shaft 48. One flexure 98 is associated with each set of radial bearings 54. In one example, the flexure 98 is formed of laser cut sheet metal. In one example, the sheet metal is carbon steel and a stiffness of 100 pounds force per millimeter. The flexure 98 is an axially flexible mount in which a radial bearing 54 is mounted to eliminate thrust loads. The flexure 98 can also provide position feedback for the magnetic thrust bearing 128.

The flexure 98 includes an outer ring 100 including a plurality of apertures 102, an inner ring 104, and a plurality of flexible attachment features 106 that connect the outer ring 100 to the inner ring 104. The inner ring 104 is connected to the radial bearings 54. In one example, the flexure 98 includes six attachment features 106. Each attachment feature 106 is substantially quadrilateral in shape, and an outer edge 108 and an inner edge 110 of each attachment feature 106 have a curvature that matches the curvature of an inner edge 112 of the outer ring 100 and an outer edge 114 of the inner ring 104, respectively. The outer edge 108 of the attachment feature 106 is attached to the outer ring 100 with an outer flange 116, and the inner edge 110 of the attachment feature 106 is attached to the inner ring 104 with an inner flange 118. Each attachment feature 106 includes an aperture or slot 120 within the quadrilateral shape to reduce axial stiffness.

Returning to FIG. 3, the outer ring 100 of the flexure 98 is located between the main housing 58 and an end ring 96 and secured to the main housing 58 by fasteners (not shown) received in the apertures 102. The inner ring 104 of the flexure 98 is located between the bearing housing 84 and the second travel stop 90. An inner edge 122 of the inner ring 104 of the flexure 98 contacts an outer diameter of one of the ball bearings 72. The attachment features 106 are located in the gap 94 between the main housing 58 and the end ring 96 that is sized to allow for movement of the attachment features 106.

The magnetic thrust bearing 128 carries all the axial loads because the radial bearings 54 are allowed to float axially. When this occurs, the inner ring 104 of the flexure 98 moves relative to the secured outer ring 100, eliminating thrust loads on the radial bearings 54. In one example, the inner ring 104 and the outer ring 100 can displace and deform approximately 0.5 millimeters (0.02 inches) relative to each other.

In another example, the radial bearing 54 is a foil bearing or a journal bearing (not shown). In this example, the radial bearings 54 float freely in the axial direction, allowing the magnetic bearing 126 to carry the axial load.

In one example, the turbomachine 46 is positioned substantially vertical or vertical during use such that the rotatable shaft 48 is substantially vertical or vertical. When the rotatable shaft 48 is substantially vertical or vertical, there are very small or no radial loads on the radial bearings 54 during start up or operation of the turbomachine 46.

In another example, the turbomachine 46 includes an actively controlled hydrostatic axial bearing. The radial bearings 54 mounted in the flexure 98 supports the turbomachine 46 during start up, and then the axial load is absorbed by the hydrostatic axial bearing.

The turbomachine 46 provides a cost and performance savings. By employing a hybrid bearing system with a magnetic thrust bearing 128 and radial bearings 54 mounted to float axially, a smaller turbomachine 46 with higher thrust loads can be produced. A hybrid bearing turbomachine 46 including both a magnetic thrust bearing 128 and radial bearings 54 can also have a tighter clearance than turbomachines having only magnetic bearings.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A turbomachine comprising:
a housing;
a rotatable shaft, wherein at least a portion of the rotatable shaft is located in the housing;
a magnetic thurst bearing that axially positions the rotatable shaft;
a radial bearing that centers the rotatable shaft; and
a flexure including a first portion secured to the housing and a second portion axially moveable relative to the first portion, wherein the second portion contacts the radial bearing, and the second portion moves axially to eliminate thrust loads on the radial bearing and to allow the magnetic thrust bearing to carry axial loads, wherein the flexure is planar.

2. The turbomachine as recited in claim 1 wherein the radial bearing comprises at least one of a ball bearing, a foil bearing, and a journal bearing.

3. The turbomachine as recited in claim 1 including a bearing housing located radially outwardly of the radial bearing, and the bearing housing includes a portion of a working fluid passage to provide a working fluid to the radial bearing.

4. The turbomachine as recited in claim 3 wherein the housing includes another portion of the working fluid passage to provide the working fluid to the radial bearing.

5. The turbomachine as recited in claim 4 including a seal between the bearing housing and the housing.

6. The turbomachine as recited in claim 1 wherein the turbomachine is employed in a system that employs a working fluid, and the working fluid lubricates the radial bearing.

7. The turbomachine as recited in claim 1 wherein the flexure is formed of sheet metal.

8. The turbomachine as recited in claim 1 wherein the first portion of the flexure is an outer ring, the second portion of the flexure is an inner ring, and the flexure includes a plurality of flexible attachment features located therebetween that allow the inner ring to move relative to the outer ring, wherein each of the plurality of attachment features include an aperture to reduce axial stiffness.

9. The turbomachine as recited in claim 1 wherein the rotatable shaft is substantially vertical when the turbomachine is in use.

10. The turbomachine as recited in claim 1 wherein the turbomachine is a turbine in an organic rankine cycle.

11. The turbomachine as recited in claim 1 wherein the turbomachine is a compressor of a refrigeration system.

12. A turbomachine comprising:
a housing;
a rotatable shaft, wherein at least a portion of the rotatable shaft is located in the housing, and the rotatable shaft is substantially vertical when the turbomachine is in use;
a magnetic thurst bearing that axially positions the rotatable shaft;
a radial bearing that centers the rotatable shaft, wherein the turbomachine is employed in a system that employs a working fluid, and the working fluid lubricates the radial bearing; and
a flexure including a first portion secured to the housing and a second portion axially moveable relative to the first portion, wherein the second portion contacts the radial bearing, and the second portion moves axially to eliminate thrust loads on the radial bearing and to allow the magnetic thrust bearing to carry axial loads, wherein the flexure is planar.

13. The turbomachine as recited in claim 12 including a bearing housing located radially outwardly of the radial bearing, and the bearing housing includes a portion of a working fluid passage and the housing includes another portion of the working fluid passage, wherein the working fluid passage provides the working fluid to the radial bearing.

14. The turbomachine as recited in claim 12 wherein the first portion of the flexure is an outer ring, the second portion of the flexure is an inner ring, and the flexure includes a plurality of flexible attachment features located therebetween that allow the inner ring to move relative to the outer ring, wherein each of the plurality of attachment features include an aperture to reduce axial stiffness.

15. The turbomachine as recited in claim 12 wherein the turbomachine is a turbine in an organic rankine cycle.

16. The turbomachine as recited in claim 12 wherein the turbomachine is a compressor of a refrigeration system.

17. The turbomachine as recited in claim 12 wherein an axial portion of an impeller is controlled to minimize a gap between the impeller and an impeller housing to maximize a compression efficiency or an expansion efficiency.

18. A method of reducing thrust loads on a radial bearing of a turbomachine, the method comprising the steps of:
rotating a shaft located in a housing of a turbomachine;
axially positioning the shaft with a magnetic thurst bearing;
securing a first portion of a flexure to the housing, wherein the flexure is planar; and
axially moving a second portion of the flexure relative to the first portion of the flexure to axially translate radial bearing to eliminate axial loads on the radial bearing created by the magnetic thrust bearing and to allow the magnetic thrust bearing to carry axial loads.

19. The turbomachine as recited in claim 1 wherein the flexure has a constant thickness.

20. The turbomachine as recited in claim 1 wherein the flexure is made of carbon steel.

21. The turbomachine as recited in claim 1 wherein the flexure is laser cut.

* * * * *